(12) United States Patent
Han et al.

(10) Patent No.: US 7,369,615 B2
(45) Date of Patent: May 6, 2008

(54) SOFT DEMODULATION METHOD AND APPARATUS

(75) Inventors: Sung-hyu Han, Seoul (KR); Ki-hyun Kim, Gyeonggi-do (KR); In-sik Park, Gyeonggi-do (KR); Yoon-woo Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 808 days.

(21) Appl. No.: 10/763,381

(22) Filed: Jan. 26, 2004

(65) Prior Publication Data

US 2004/0201503 A1 Oct. 14, 2004

(30) Foreign Application Priority Data

Jan. 27, 2003 (KR) ............... 10-2003-0005305

(51) Int. Cl.
*H04B 14/06* (2006.01)

(52) U.S. Cl. .................. 375/246; 375/253; 375/262; 375/341; 714/774; 714/794

(58) Field of Classification Search ............ 375/246, 375/253, 262, 265, 285, 340, 341, 348; 714/774, 714/786, 792, 794, 795, 796
See application file for complete search history.

(56) References Cited

U.S. PATENT DOCUMENTS

| | | | | |
|---|---|---|---|---|
| 6,434,203 B1 * | 8/2002 | Halter | ............ | 375/341 |
| 6,662,331 B1 * | 12/2003 | Kang | ............ | 714/755 |
| 6,961,921 B2 * | 11/2005 | Hepler et al. | ............ | 714/796 |
| 2004/0201503 A1 | 10/2004 | Han et al. | | |

FOREIGN PATENT DOCUMENTS

| | | |
|---|---|---|
| JP | 8-185389 | 7/1996 |
| JP | 2002-367291 | 12/2002 |

OTHER PUBLICATIONS

"Turbo Codes Cascaded with High-Rate Block Codes for (O, k)-Constrained Channels", IEEE Journal On Selected Areas In Communications, vol. 19, No. 4, Apr. 2001, pp. 677-685.
Office Action issued in Japanese Patent Application No. 2004-014594 on Jan. 30, 2007.
Preliminary Notice of the First Office Action issued by the Taiwan Intellectual Property Office on Oct. 20, 2006 re: Taiwanese Patent Application No. 093101491 (4 pp).
Laura L. McPheters, et al., Turbo-Coded Optical Recording Channels with DVD Minimum Mark Size, Jan. 2002, p. 298-302.
Office Action issued in corresponding Japanese Patent Application No. 2004-014594 on Jun. 12, 2007.
Laura L. McPheters et al. "Turbo-Coded Optical Recording Channels With DVD Minimum Mark Size". IEEE Transactions on Magnetics, Jan. 2002, vol. 38, No. 1, p. 298-302.
"Turbo Codes Cascaded with High-Rate Block Codes for (O, k)-Constrained Channels", IEEE Journal On Selected Areas in Communications, vol. 19, No. 4, Apr. 2001, pp. 677-685.

* cited by examiner

*Primary Examiner*—Dac V. Ha
(74) *Attorney, Agent, or Firm*—Stein, McEwen & Bui, LLP

(57) ABSTRACT

A soft demodulation method and apparatus including calculating partial sums for a unit of each predetermined number of bits of a codeword received from a channel; calculating a value of each entry of the decoding table by referring to the partial sums; and detecting a maximum among values of all entries of the decoding table and calculating a log-likelihood ratio (LLR) using the detected maximum. Accordingly, it is possible to reduce the amount of computation required to perform a soft demodulation process using run-length limited (RLL) codes and to simplify the soft demodulation process.

18 Claims, 11 Drawing Sheets

| | $d_k d_{k+1}$ |
|---|---|
| 1 | 000 101 001 010 010 100 |
| 2 | 010 010 001 010 010 100 |
| ... | ... |
| 5000 | 000 101 001 010 010 010 |

FIG. 4 (PRIOR ART)

| | $r_0$ | $r_1$ | $r_2$ | $r_3$ | $r_4$ | $r_5$ | $r_6$ | $r_7$ | $r_8$ | $r_9$ | $r_{10}$ | $r_{11}$ | $r_{12}$ | $r_{13}$ | $r_{14}$ | $r_{15}$ | $r_{16}$ | $r_{17}$ |
|---|---|---|---|---|---|---|---|---|---|---|---|---|---|---|---|---|---|---|
| RECEIVED CODE SIGNAL: /410 |
| TABLE ENTRY: /420 | 0 | 0 | 0 | 1 | 0 | 1 | 0 | 0 | 1 | 0 | 1 | 0 | 0 | 1 | 0 | 1 | 0 | 0 |
| CALCULATION RESULT: /430 | $-r_0$ | $-r_1$ | $-r_2$ | $+r_3$ | $-r_4$ | $+r_5$ | $-r_6$ | $-r_7$ | $+r_8$ | $-r_9$ | $+r_{10}$ | $-r_{11}$ | $-r_{12}$ | $+r_{13}$ | $-r_{14}$ | $+r_{15}$ | $-r_{16}$ | $-r_{17}$ |

SOFT DEMODULATION METHOD AND APPARATUS

CROSS-REFERENCE TO RELATED APPLICATIONS

This application claims the priority of Korean Patent Application No. 2003-5305, filed on Jan. 27, 2003, in the Korean Intellectual Property Office, the disclosure of which is incorporated herein in its entirety by reference.

BACKGROUND OF THE INVENTION

1. Field of the Invention

The present invention relates to data decoding, and more particularly, to a soft demodulation method and apparatus.

2. Description of the Related Art

In an environment where inter symbol interference (ISI) exists, such as a high-density optical recording medium, data is modulated by using run-length limited (RLL) codes.

When conventional RLL codes are decoded, a channel demodulator, such as a Viterbi decoder, detects codewords from a signal input via a channel, and an RLL decoder decodes the codewords into datawords by referring to a decoding table.

Recently, soft demodulators and soft decoders have been increasingly used for a variety of purposes. The Viterbi decoder directly outputs a codeword, which contains an error and simply has a value of "1" or "−1". This type of modulation is called hard demodulation. In soft demodulation, however, a soft demodulator receives a channel signal and outputs a probability value of a codeword. In other words, the output of the soft demodulator has an analog value, such as "0.8" or "−0.8", containing the probability of a codeword having a value of 1 or −1. The soft demodulator receives data indicating the probability value of the codeword and outputs a probability value of a dataword. Then, a soft encoder, such as a turbo encoder, receives the probability of the dataword from the soft demodulator and encodes the codeword into the dataword.

A turbo decoding process that requires soft demodulation is taught by Laura L. McPheters and Steven W. McLaughlin in "Turbo-Coded Optical Recording Channels with DVD Minimum Mark Size," IEEE Transactions on Magnetics, Vol. 38, No. 1, January 2002, pp. 298~302.

FIG. 1 is a block diagram of a conventional encoding/decoding apparatus. Referring to FIG. 1, an encoding/decoding apparatus 100 includes a turbo/low density parity check code (LDPC) encoder 110, a modulator 120, a reader/writer 130, a soft demodulator 150, and a turbo/LDPC decoder 160.

Data is input to the turbo/LDPC encoder 110, which encodes the data by using a soft encoding method, such as an LDPC encoding method or a turbo encoding method. The modulator 120 modulates data output from the turbo/LDPC encoder 110 in a predetermined demodulation manner that uses, for example, an RLL code. The reader/writer 130 records the modulated data on a recording medium 140 or reads data from the recording medium 140. The soft demodulator 150 receives data indicating a probability value of a codeword from the reader/writer 130 and then outputs a log likelihood ratio (LLR), which corresponds to a probability value of each bit of a dataword. The turbo/LDPC decoder 160 carries out a soft decoding on data output from the soft demodulator 150 taking into consideration how the corresponding data has been encoded. Thereafter, the turbo/LDPC decoder 160 outputs the soft-decoded data.

The soft demodulator 150 obtains the LLR by calculating a posteriori probability (APP) ($d_k$=1) and APP($d_k$=0). APP ($d_k$=1) represents the probability of demodulated data having a value of "1", and APP($d_k$=0) represents the probability of demodulated data having a value of "0". APP($d_k$=1) and APP($d_k$=0) are obtained in the following manner. If a codeword, which is used for determining a dataword, is comprised of N bits, values of $(r_m - 2*c_m - 1))^2$ (where m=1, ..., N) for bits of each codeword that sets a bit of the dataword to 1 are summed up. In short, APP($d_k$=1) can be obtained by summing up an exponential value of $(r^m - 2*c_m - 1))^2$ for each codeword that sets a bit of the dataword to 1, which is shown in Equation (1) below.

$$APP(d_k = 1) = \sum_{j \in S_1(k)} \exp\left[r_m^j - (2*c_m^j - 1)^2\right] \quad (1)$$

In Equation (1), j indicates that a j-th dataword has a value of 1.

Likewise, APP($d_k$=0) is obtained using Equation (2) below.

$$APP(d_k = 0) = \sum_{j \in S_0(k)} \exp\left[r_m^j - (2*c_m^j - 1)^2\right] \quad (2)$$

LLR($d_k$) is obtained by exponentiating a ratio between the probability APP($d_k$=0) of the j-th bit of the dataword $d_k$ having a value of 0 and the probability APP($d_k$=1) of the j-th bit of the dataword $d_k$ having a value of 1, a process which is shown in Equation (3) below. LLR($d_k$) is an output of the soft demodulator 150.

$$LLR(d_k) = \log \frac{(APP(d_k) = 1)}{(APP(d_k) = 0)} \quad (3)$$

If it is too complicated to exponentiate the ratio between APP($d_k$=1) and APP($d_k$=0), LLR($d_k$) can be obtained by subtracting APP($d_k$=0) from APP($d_k$=1). The structure of the soft demodulator 150, which calculates LLR($d_k$) in this manner, is illustrated in FIG. 2.

Referring to FIG. 2, the soft demodulator 150 includes a decoding table 151, an entry calculator 152, a maximum detector 153, and an LLR calculator 154. The decoding table 151 is illustrated in FIG. 3.

The entry calculator 152 performs a predetermined calculation on a read code signal using each entry of the decoding table 151. Hereinafter, the predetermined calculation will be described more fully with reference to FIG. 4. More specifically, the entry calculator 152 associates each bit of an input code signal 410 with each bit of the entry 420. If a bit of the entry 420, corresponding to a given bit of the input code signal 410, has a value of 0, the given bit of the input code signal 410 is multiplied by −1. On the other hand, if a bit of the entry 420, corresponding to the given bit of the input code signal 410, has a value of 1, the given bit of the input code signal 410 is multiplied by +1. The entry calculator 152 performs this type of multiplication on each bit of the input code signal 410 and then sums up all multiplication results, thus obtaining a result 430 of the predetermined calculation.

For example, assume that the input code signal 410 is "$r_0 r_1 \ldots r_{17}$" and the entry is "000101 . . . 100", as shown in FIG. 4. Because the fourth, sixth, ninth, eleventh, fourteenth, and sixteenth bits of the entry 420 have a value of 1 and the other bits of the entry 420 have a value of 0, $r_3$, $r_5$, $r_8$, $r_{10}$, $r_{13}$, and $r_{15}$ are multiplied by +1, and the other bits of the are multiplied by −1. Thereafter, the multiplication results are summed up. The entry calculator 152 carries out the predetermined calculation on the input code signal 410 as many times as the number of entries of the decoding table 151.

The maximum detector 153 receives as many results of the predetermined calculation from the entry calculator 152 as the number of entries of the decoding table 151 and detects a maximum among the predetermined calculation results.

The LLR calculator 154 calculates LLR($d_k$) by subtracting a maximum regarding "0" from a maximum regarding "1", by a process as shown in Equation (4) below. Thereafter, the LLR calculator 154 outputs LLR($d_k$).

$$LLR(d_k) = \max_{j \in S_1(k)} \left[ \sum_{m=0}^{t-1} r_m^j * 2(c_m^j - 1) \right] - \max_{j \in S_0(k)} \left[ \sum_{m=0}^{t-1} r_m^j * 2(c_m^j - 1) \right] \quad (4)$$

LLR($d_{k+1}$) can be obtained by simply substituting k+1 into Equation (4), as shown in Equation (5) below.

$$LLR(d_{k+1}) = \max_{j \in S_1(k+1)} \left[ \sum_{m=0}^{t-1} r_m^j * 2(c_m^j - 1) \right] - \max_{j \in S_0(k+1)} \left[ \sum_{m=0}^{t-1} r_m^j * 2(c_m^j - 1) \right] \quad (5)$$

In Equation (5), $S_0$(k+1) indicates a set of entries of the decoding table 151 of FIG. 3, and $S_1$(k+1) indicates a set of entries of a decoding table, which is very similar to the decoding table 151.

If soft modulation is carried out using the decoding table 151, as many as 85,000 calculations are required. Here, 85,000 is obtained by multiplying a total number of additions and subtractions using bits of each entry of the decoding table 151, i.e., 17, by the number of entries of the decoding table 151, i.e., 5,000.

As described above, in the related art, as the size of an APP decoding table used for soft demodulation increases, the time taken to calculate an LLR increases, and the APP decoding table becomes remarkably complicated.

SUMMARY OF THE INVENTION

The present invention provides a soft demodulation method and apparatus, which can reduce the complexity of a decoding table used in soft demodulation and the amount of computation required to carry out the soft demodulation.

According to an aspect of the present invention, there is provided a soft demodulation method. The soft demodulation method involves calculating partial sums for a unit of each predetermined number of bits of a codeword received from a channel; calculating a value of each entry of the decoding table by referring to the partial sums; and detecting a maximum among values of all entries of the decoding table and calculating a log-likelihood ratio (LLR) using the detected maximum.

Additional aspects and/or advantages of the invention will be set forth in part in the description which follows and, in part, will be obvious from the description, or may be learned by practice of the invention.

In an aspect of the present invention, the partial sums for the unit of each predetermined number of bits of the codeword is calculated by using reference entries, and each of the reference entries is comprised of a combination of some bits of each of the entries of the decoding table.

In an aspect of the present invention, the calculating the value of each entry includes dividing each of the entries of the decoding table into bit units, each of the bit units comprised of the predetermined number of bits; and calculating the value of each of the entries of the decoding table by summing up the partial sums corresponding to the bit units of each of the entries of the decoding table.

In an aspect of the present invention, if partial sums corresponding to bit units of a predetermined entry of the decoding table do not exceed a predetermined threshold value, a value of the predetermined entry is not calculated.

According to another aspect of the present invention, there is provided a soft demodulation apparatus. The soft demodulation apparatus includes a partial sum calculator, which calculates partial sums for a unit of each predetermined number of bits of a codeword received from a channel; an entry calculator, which calculates a value of each entry of the decoding table by referring to the partial sums; a maximum detector, which detects a maximum among values of all entries of the decoding table; and a log-likelihood ratio (LLR) calculator, which calculates an LLR using the detected maximum.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 is a diagram illustrating the operation of an entry calculator of FIG. 2;

DETAILED DESCRIPTION OF THE EMBODIMENTS

Figure 1:
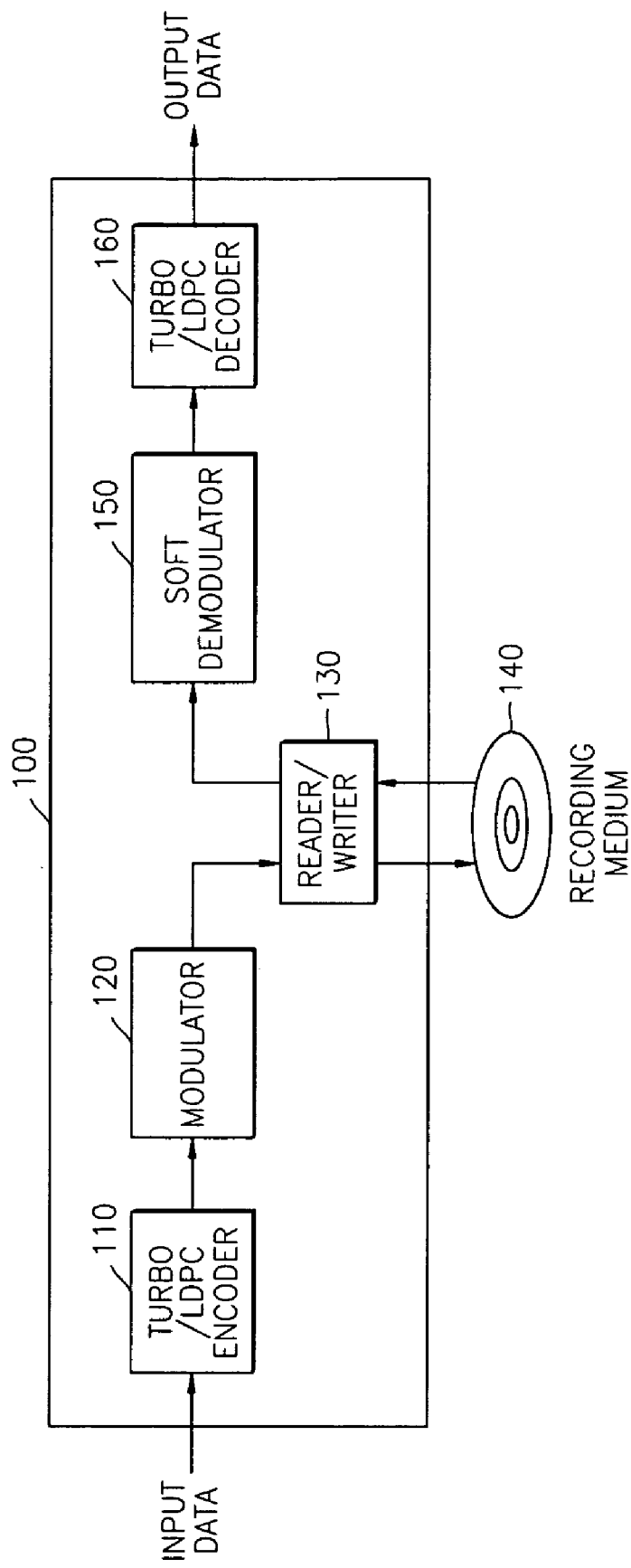
FIG. 1 is a schematic block diagram of a conventional data encoding/decoding apparatus.

Reference will now be made in detail to the embodiments of the present invention, examples of which are illustrated in the accompanying drawings, wherein like reference numerals refer to the like elements throughout. The embodiments are described below to explain the present invention by referring to the figures.

Figures 2, 3:
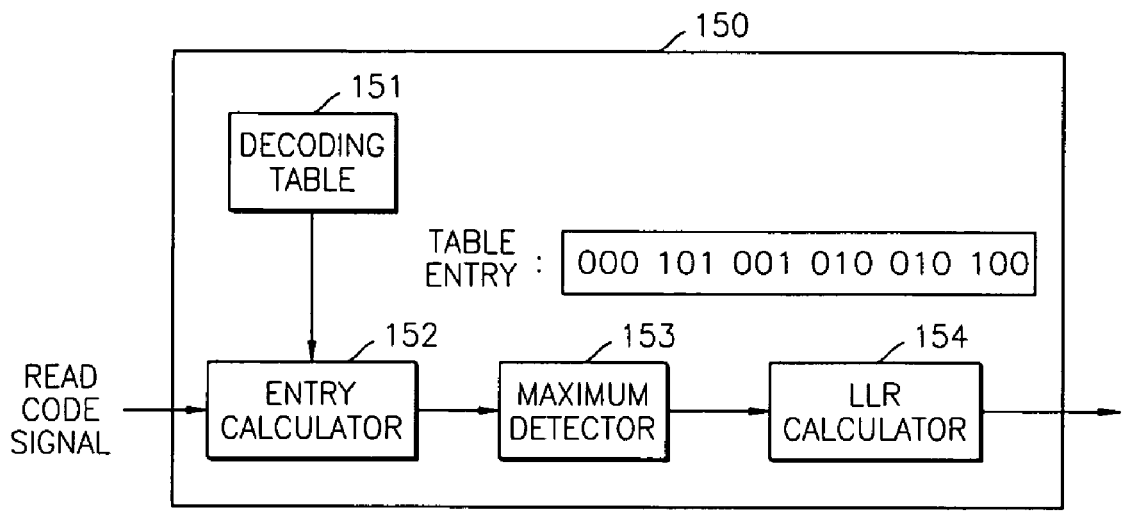
FIG. 2 is a block diagram of the soft demodulator of FIG. 1.
FIG. 3 is a diagram illustrating an example of a decoding table of FIG. 2.
Figure 5:
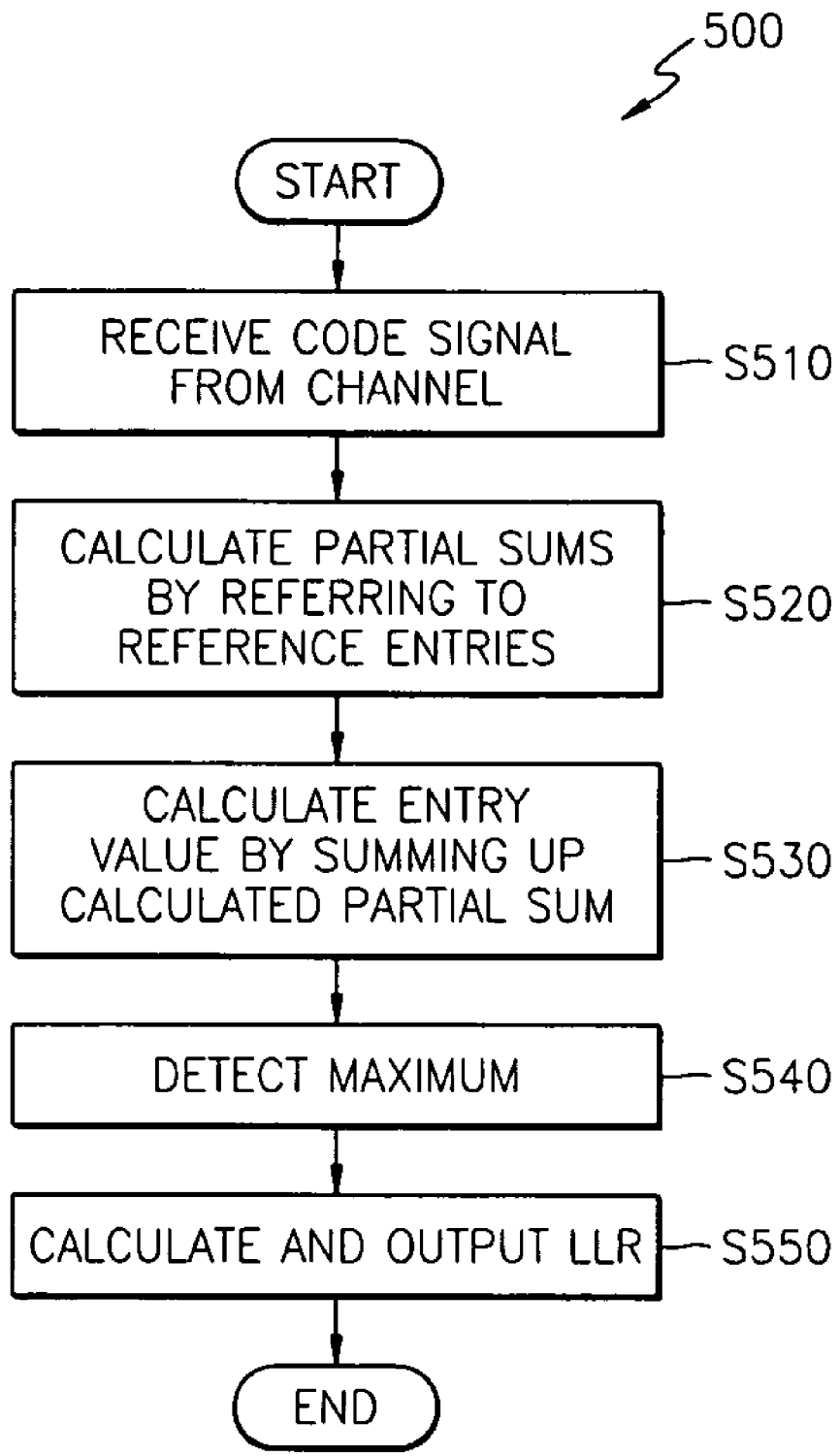
FIG. 5 is a flowchart of a soft demodulation method according to an embodiment of the present invention.

FIG. 5 is a flowchart of a soft demodulation method according to an embodiment of the present invention. Referring to FIG. 5, a code signal, which is comprised of 18 bits, is received from a channel in operation S510. In operation S520, partial sums for bits of the received code signal are calculated using reference entries. Here, the reference entries are unit entries each comprised of a predetermined number of bits selected from bits constituting each entry of a decoding table. Each entry of the decoding table, like the decoding table 151 of FIG. 3, may be comprised of 18 bits. However, the decoding table does not have as many entries as the total number of combinations of the 18 bits, i.e., $2^{18}$. Each entry is comprised of a combination of 5 unit entries, i.e., 5 reference entries. Each of the 5 reference entries comprises 3 bits. The five reference entries are "000", "001", "010", "100", and "101".

In operation S520, partial sums of each three bits of the received code signal are calculated by referring to the reference entries. For example, partial sums of the first three bits $r_0$, $r_1$, and $r_2$ of the received code signal are calculated by using each of the reference entries "000", "001", "010", "100", and "101". As a result, partial sums $-r_0-r_1-r_2$, $-r_0-r_1+r_2$, $-r_0+r_1-r_2$, $+r_0-r_1-r_2$, and $+r_0-r_1+r_2$ are obtained of the first three bits $r_0$, $r_1$, and $r_2$ of the received code signal. Thereafter, partial sums $-r_3-r_4-r_5$, $-r_3-r_4+r_5$, $-r_3+r_4-r_5$, $+r_3-r_4-r_5$, and $+r_3-r_4+r_5$ are obtained of the next three bits $r_3$, $r_4$, and $r_5$ of the received code signal. In this manner, partial sums for the rest of the received code signal are calculated by using the five reference entries.

In operation S530, each entry value is calculated using the five partial sums for each three bits of the received code signal. In other words, if an entry is "000 101 001 010 010 100", a partial sum entry corresponding to each three bits of the entry is searched and then is summed up. More specifically, the first three bits of the entry, i.e., "000", correspond to the partial sum entry $-r_0-r_1-r_2$, and the next three bits of the entry, i.e., "101", correspond to the partial sum entry $+r_3-r_4+r_5$. In this manner, the value of the entry is obtained by searching for and summing up the partial sum entry corresponding to each three bits of the entry. Operation S530 is performed on each of the 5000 entries of the decoding table, thus obtaining 5000 calculated entry values.

In operation S540, a maximum among the 5000 calculated entry values is detected. In operation S550, an LLR is calculated using the detected maximum and then is output.

When the decoding table has, for example, 5000 entries and there are 6 partial sum tables provided, a total number of calculations required amounts to 25,060 (=5 (the number of partial sum entries)×6 (the number of partial sum tables)×2 (the number of calculations performed on each entry)+5000 (the number of entries of the decoding table)×5 (the number of partial sums to be summed up for the calculation of one entry value)).

Figure 6:
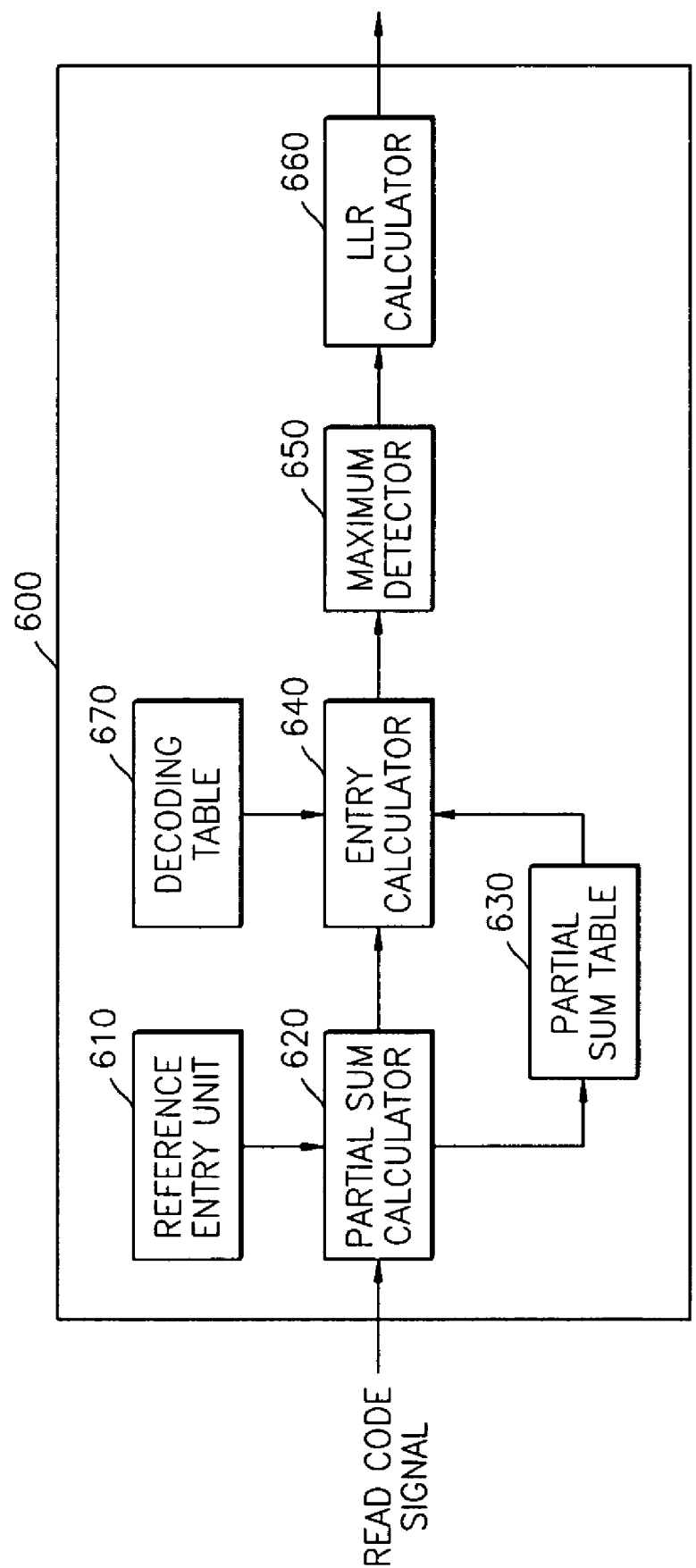
FIG. 6 is a block diagram of a soft demodulation apparatus according to an embodiment of the present invention.

FIG. 6 illustrates a soft demodulation apparatus 600 according to an embodiment of the present invention, which performs the soft demodulation method of FIG. 5. Referring to FIG. 6, the soft demodulation apparatus 600 includes a reference entry unit 610, a partial sum calculator 620, a partial sum table 630, an entry calculator 640, a maximum detector 650, an LLR calculator 660, and a decoding table 670.

Figure 7:
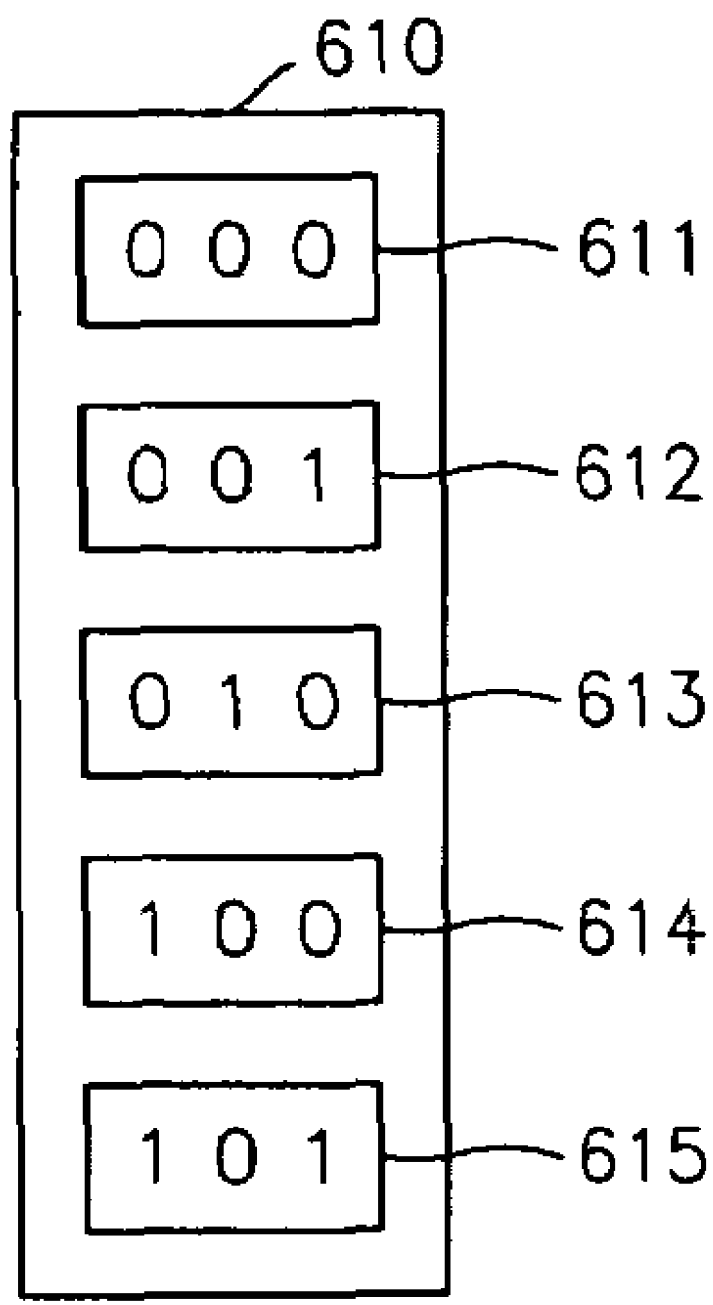
FIG. 7 is a diagram illustrating an example of a reference entry of FIG. 6.

FIG. 7 shows an example of the reference entry unit 610, which includes five reference entries "000" (611), "001" (612), "010" (613), "100" (614), and "101" (615).

The partial sum calculator 620 receives the reference entries 611 through 615 from the reference entry unit 610 and each three bits of a code signal read from a channel and calculates partial sums for each three bits of the code signal using the received reference entries. For example, supposing that three bits $r_0$, $r_1$, and $r_2$ of the code signal are received, partial sums $-r_0-r_1-r_2$, $-r_0-r_1+r_2$, $-r_0+r_1-r_2$, $+r_0-r_1-r_2$, and $+r_0-r_1+r_2$ are obtained by applying the reference entries "000", "001", "010", "100", and "101", respectively, to the three bits $r_0$, $r_1$, and $r_2$ of the code signal.

When the calculation of partial sums for each three bits of the code signal using the reference entries is completed, the partial sum table 630 is formed. An example of the partial sum table 630 is illustrated in FIG. 8.

Figure 8:
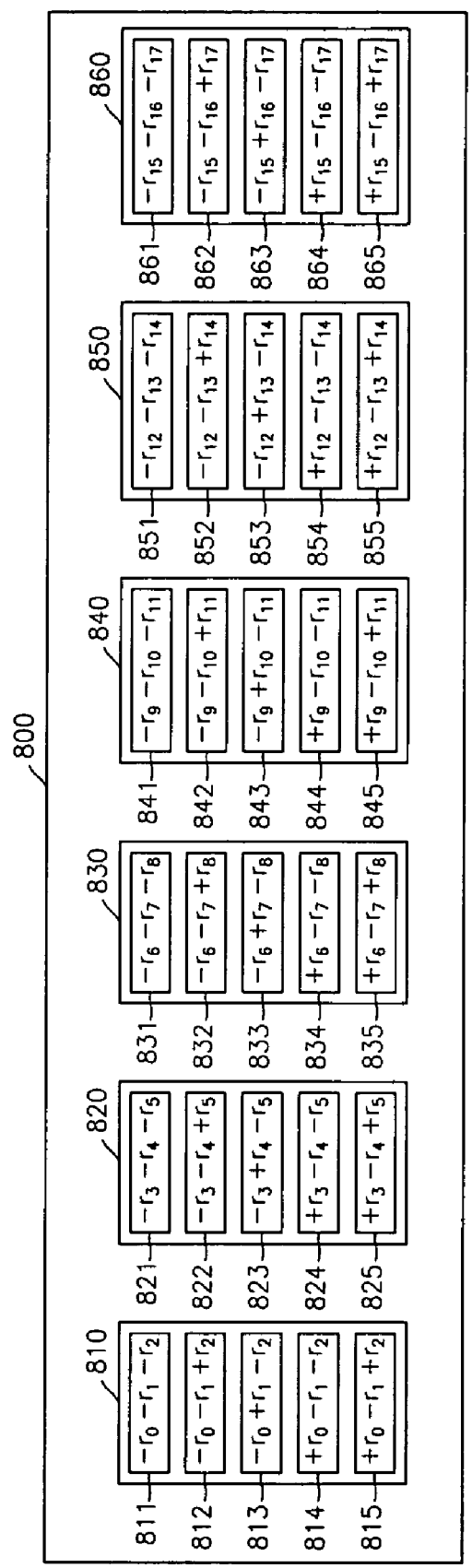
FIG. 8 is a diagram illustrating an example of a partial sum table of FIG. 6.

Referring to FIG. 8, the partial sum table 800 includes 6 sub-tables 810, 820, 830, 840, 850, and 860, and each of the sub-tables 810, 820, 830, 840, 850, and 860 includes five partial sums.

The entry calculator 640 calculates values of entries of the decoding table 670 by using the partial sums of the partial sum table 630. For example, if a first entry of the decoding table 670 is "000 101 001 010 010 100", partial sums corresponding to each three bits of the first entry are searched for in the partial sum table 630 and are added together.

For example, the first three bits "000" of the first entry correspond to the partial sum entry 811, i.e., $-r_0-r_1-r_2$, and the next three bits "101" of the first entry correspond to the partial sum entry 825, i.e., $+r_3-r_4+r_5$. In this manner, partial sums for the rest of the first entry are searched for in the partial sum table 800. The partial sums for each three bits of the example first entry are shown in the following table.

TABLE 1

| Bits of Entry of Decoding Table | Partial sums |
|---|---|
| 000 | $-r_0-r_1-r_2$ |
| 101 | $+r_3-r_4+r_5$ |
| 001 | $-r_6-r_7+r_8$ |
| 010 | $-r_9+r_{10}-r_{11}$ |
| 010 | $-r_{12}+r_{13}-r_{14}$ |
| 100 | $+r_{15}-r_{16}-r_{17}$ |

A result of summing up the partial sums for each three bits of the first entry is a value of the first entry. The entry calculator 640 calculates the values of each of the 5000 entries of the above-described manner.

The maximum detector 650 detects a maximum among the 5000 entry values obtained by the entry calculator 640.

The LLR calculator 660 calculates an LLR using the maximum detected by the maximum detector 650.

Figure 9:
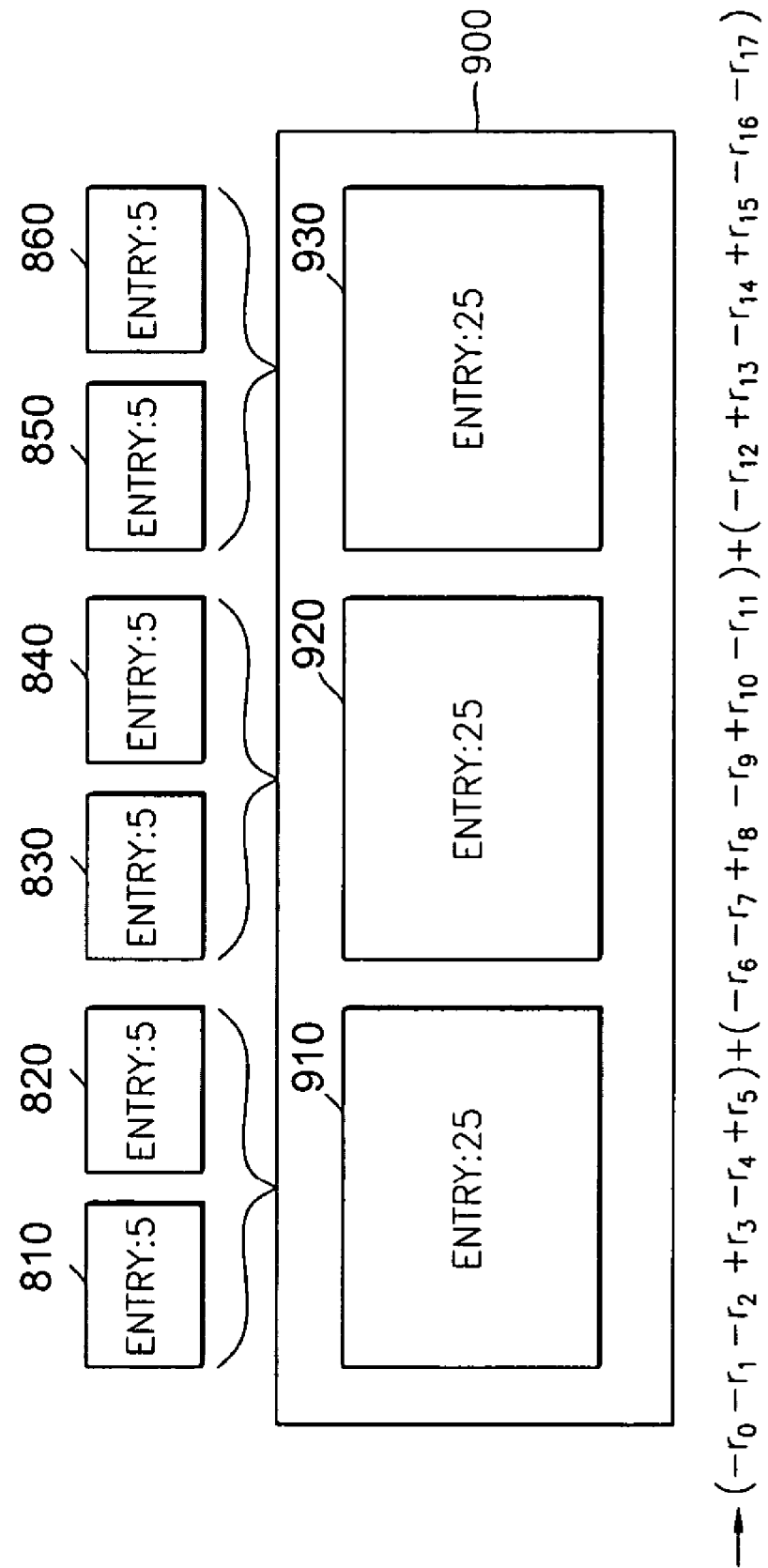
FIG. 9 is a diagram illustrating another example of the partial sum table of FIG. 6.

FIG. 9 illustrates another example of the partial sum table 630. Referring to FIG. 9, the partial sum table 900 includes a sub-table 910, into which the sub-tables 810 and 820 of the partial sum table 800 illustrated in FIG. 8 are integrated, a sub-table 920, into which the sub-tables 830 and 840 are integrated, and a sub-table 930, into which the sub-tables 850 and 860 are integrated. Each of the sub-tables 910, 920, and 930 includes 25 (5×5) entries.

In the case of calculating the entry values of the decoding table 670 using the partial sum table 900, the total number of calculations required amounts to 10,135 (=30×2 (the number of calculations required to form the six sub-tables 810 through 860 of the partial sum table 800)+3×25 (the number of calculations required to form the three sub-tables 910 through 930 of the partial sum table 900)+5000×2 (the number of calculations required to calculate the 5000 entry values of the decoding table 670)).

Figure 10:
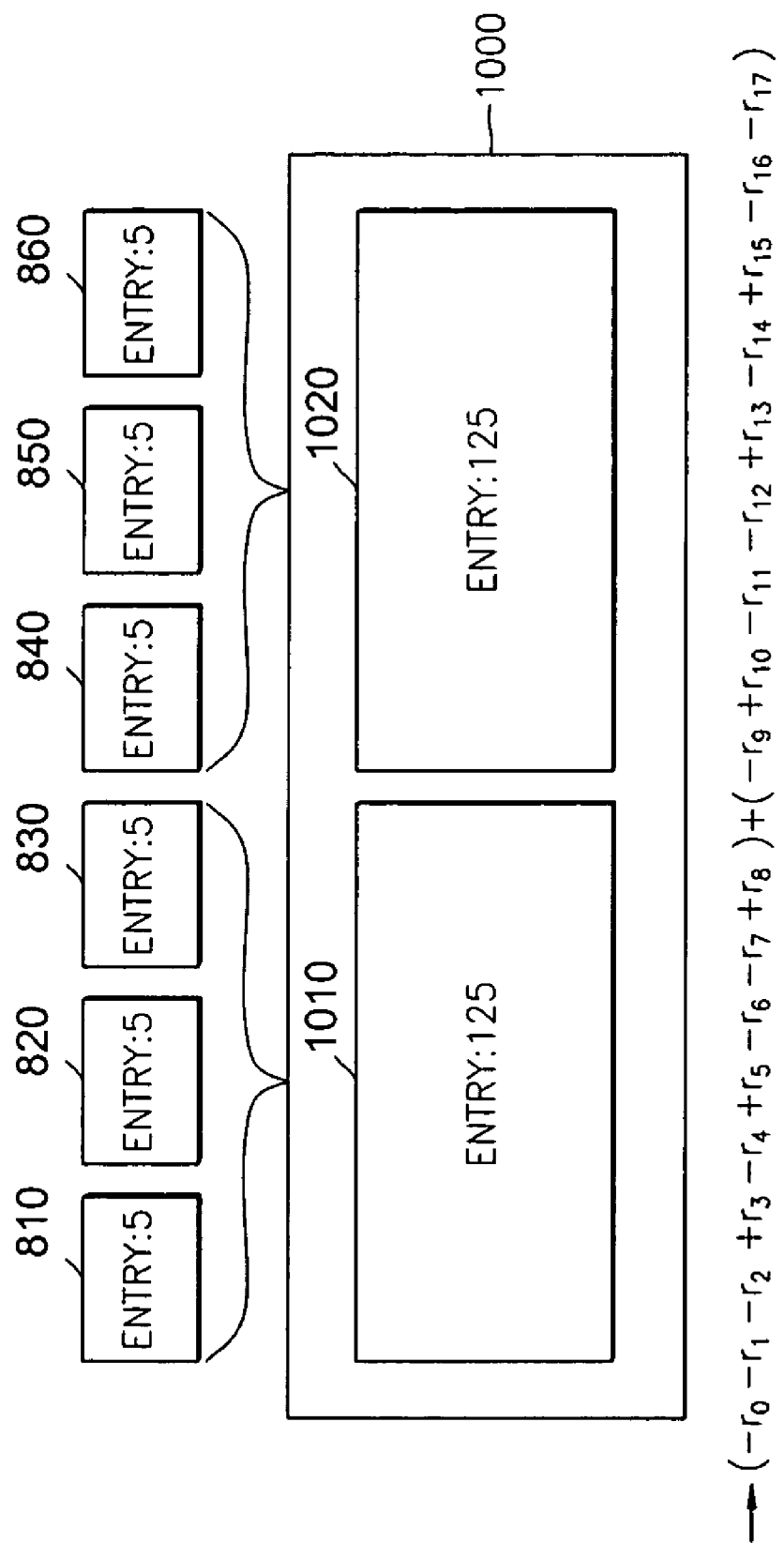
FIG. 10 is a diagram illustrating still another example of the partial sum table of FIG. 6.

FIG. 10 illustrates still another example of the partial sum table 630. Referring to FIG. 10, the partial sum table 1000 includes a sub table 1010, into which the sub-tables 810, 820 and 830 of the partial sum table 800 are integrated, and a sub table 1020, into which the sub-tables 840, 850, and 860 are integrated. Therefore, each of the sub-tables 1010 and 1020 includes 125(5×5×5) entries.

In the case of calculating the entry values of the decoding table 670 using the partial sum table 1000, the total number of calculations required amounts to 5,310 (=30×2 (the number of calculations required to form the six sub-tables 810 through 860 of the partial sum table 800)+2×125 (the number of calculations required to form the two sub-tables 1010 and 1020 of the partial sum table 1000)+5000×1 (the number of calculations required to calculate the 5000 entry values of the decoding table 670)).

Figure 11:
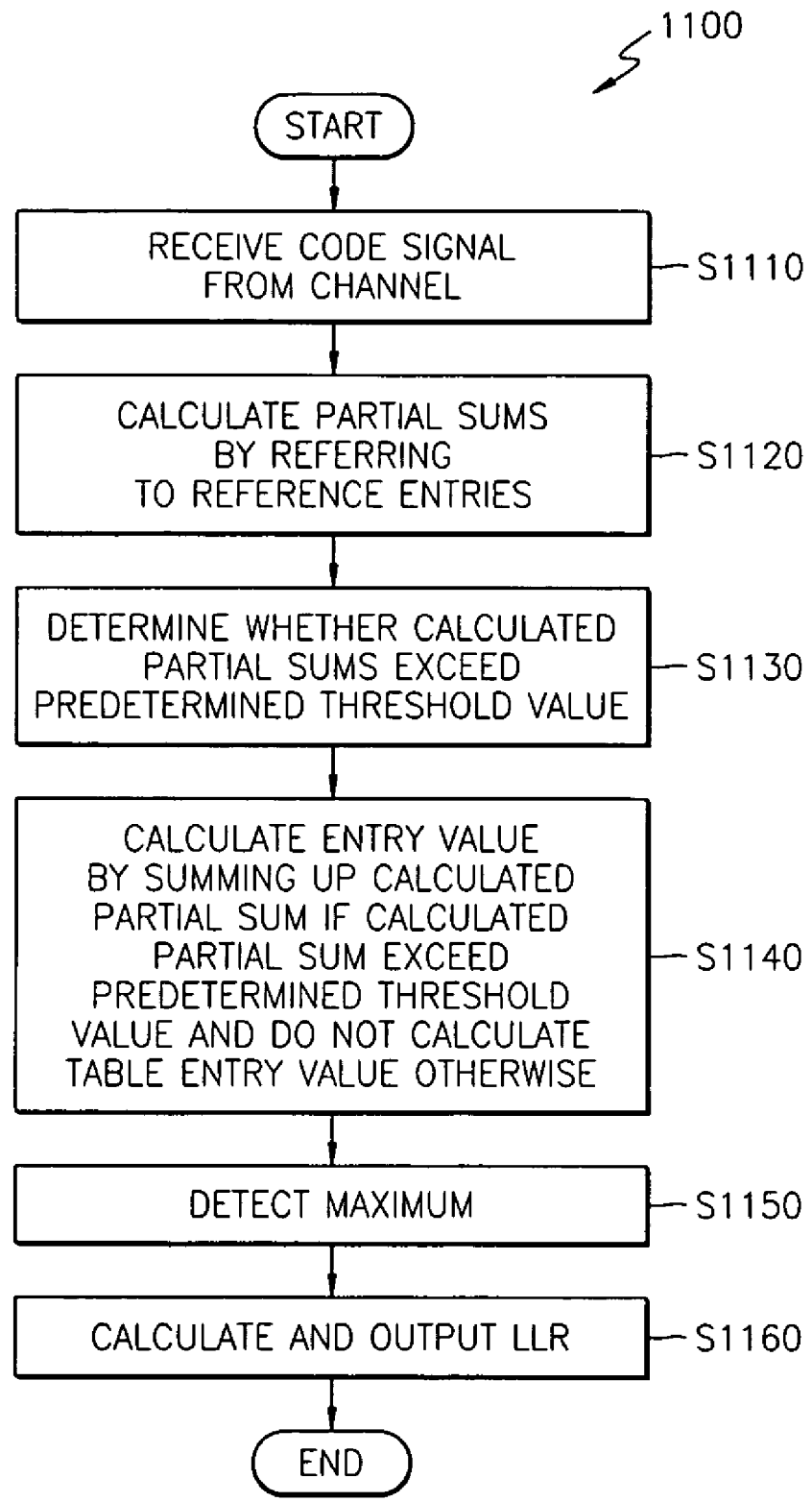
FIG. 11 is a flowchart of a soft demodulation method according to an embodiment of the present invention.

FIG. 11 is a flowchart of a soft demodulation method according to an embodiment of the present invention. If the partial sums of each entry of the decoding table 670 do not reach a predetermined value, i.e., a threshold value, the partial sums are ignored rather than being summed up to calculate an entry value of the decoding table 670. Therefore, it is possible to reduce the amount of computation required.

For example, assume that the threshold value is set to 0, the first entry of the decoding table 670 is "000 101 001 010 010 100", and the partial sum table 630 of FIG. 6, like the partial sum table 1000 of FIG. 10, is divided into two sub tables 1010 and 1020. A partial sum entry $r_0+r_1+r_2+r_3+r_4+r_5+r_6+r_7+r_8$ is searched for in the first sub-table 1010 for first nine bits of the first entry, and a partial sum entry $r_9+r_{10}+r_{11}+r_{12}+r_{13}+r_{14}+r_{15}+r_{16}+r_{17}$ is searched for in the second sub-table 1020 for the rest of the first entry. If at least one of the partial sums is smaller than the threshold value, i.e., 0, the partial sums are ignored rather than to be summed up to calculate the value of the first entry, and then a process of calculating a value of a second entry of the decoding table 670 is carried out. In other words, if a partial sum necessary for calculating a predetermined entry value has a value smaller than the threshold value, the predetermined entry value is not calculated. The threshold value may be set to a different value than 0 according to a channel state. If no partial sum entry exceeds the threshold value, the calculation of each of the entry values of the decoding table 670 should be performed again with the threshold value set lower.

Referring to FIG. 11, a code signal is received from a channel in operation S1110. In operation S1120, partial sums are calculated using reference entries. Operation 1120 is the same as operation S520 of FIG. 5. In operation S1130, it is determined whether each of the partial sums calculated in operation S1120 exceeds a predetermined threshold value. In operation S1140, if each of the partial sums does not exceed the predetermined threshold value, the partial sums are ignored. Otherwise, an entry value of a decoding table is calculated by summing up the partial sums. In operation S1150, a maximum among all entry values of the decoding table is detected. In operation S1160, an LLR is calculated using the maximum detected in operation S1150 and then is output.

If the partial sums of each entry of the decoding table do not reach a predetermined value, i.e., a threshold value, the partial sums are ignored rather than being summed up to calculate an entry value of the decoding table. Therefore, the amount of computation required to calculate entry values may be reduced.

Figure 12:
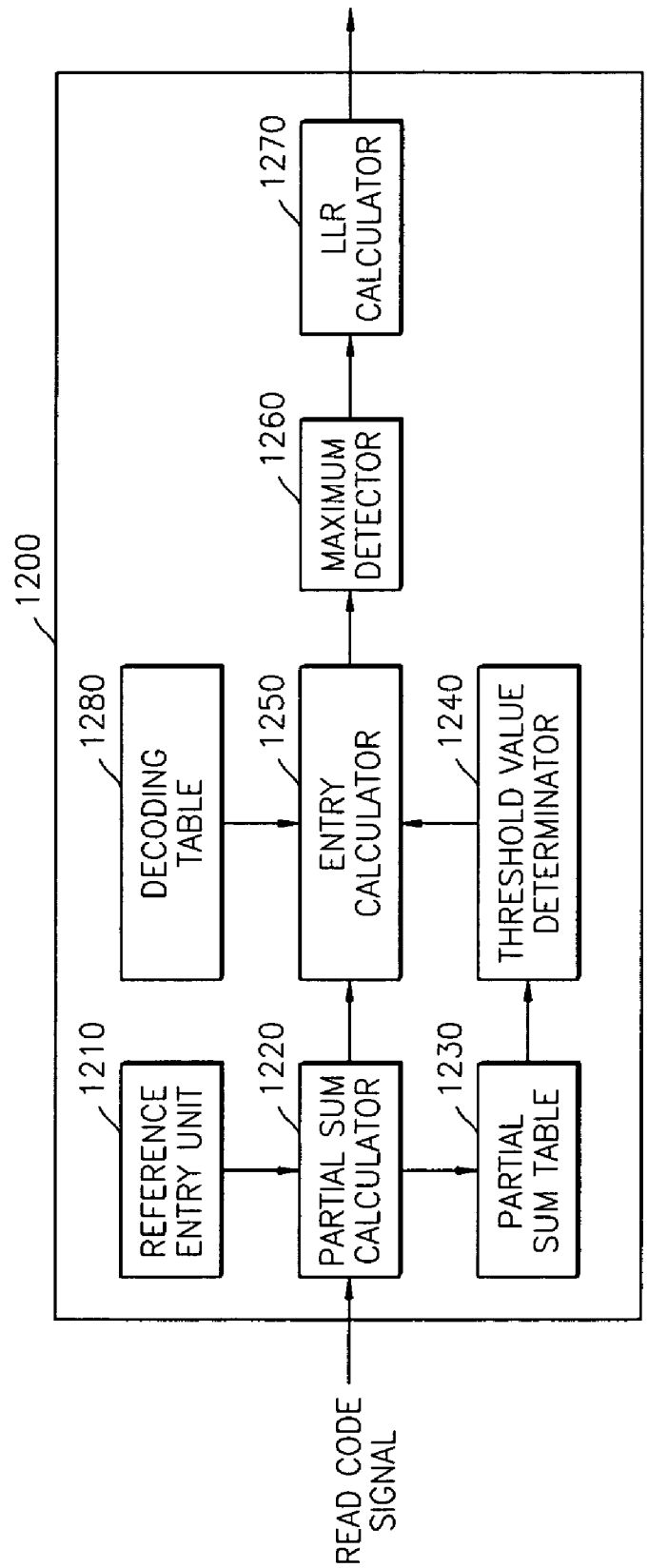
FIG. 12 is a block diagram of a soft demodulation apparatus according to an embodiment of the present invention.

FIG. 12 is a block diagram of a soft demodulation apparatus 1200 according to an embodiment of the present invention, which performs the soft demodulation method of FIG. 11. Referring to FIG. 12, the soft demodulation apparatus 1200 includes a reference entry unit 1210, a partial sum calculator 1220, a partial sum table 1230, a threshold value determinator 1240, an entry calculator 1250, a maximum detector 1260, an LLR calculator 1270, and a decoding table 1280.

The soft demodulation apparatus 1200 of FIG. 12 is the same as the soft demodulation apparatus of FIG. 6 except that it includes the threshold value determinator 1240.

In other words, the reference entry unit 1210, like the reference entry unit 610 illustrated in detail in FIG. 7, includes reference entries "000", "001", "010", "100", and "101". The partial sum calculator 1220 calculates partial sums by referring to the reference entries of the reference entry unit 1210. The partial sum table 1230 stores the partial sums calculated by the partial sum calculator 1220.

The entry calculator 1250 searches the partial sum table 1230 for partial sums corresponding to a predetermined entry. Then, the threshold value determinator 1240 determines whether the partial sums searched for by the entry calculator 1250 exceed a predetermined threshold value.

If the partial sums corresponding to the predetermined entry exceed the predetermined threshold value, the entry calculator 1250 calculates a value of the predetermined entry by summing up the partial sums. Otherwise, the partial sums are abandoned, and then a value of a next entry is calculated without calculating the value of the predetermined entry.

Thus, to save computation resources a partial sum entry that is less likely to be detected as a maximum is abandoned, and the value of a corresponding entry is not calculated.

According to the present invention, it is possible to reduce the amount of computation required to perform a soft demodulation process using run-length limited (RLL) codes and to simplify the soft demodulation process.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A soft demodulation method, comprising:
calculating partial sums for a unit of each predetermined number of bits of a codeword received from a channel;
calculating a value of each entry of a decoding table by referring to the partial sums; and
detecting a maximum among values of all entries of the decoding table and calculating a log-likelihood ratio (LLR) using the detected maximum,
wherein the partial sums for the unit of each predetermined number of bits of the codeword is calculated by using reference entries, and each of the reference entries is comprised of a combination of some bits of each of the entries of the decoding table.

2. The soft demodulation method of claim 1, wherein the calculating the value of each entry comprises:
   dividing each of the entries of the decoding table into bit units, each of the bit units comprising the predetermined number of bits; and
   calculating the value of each of the entries of the decoding table by summing up the partial sums corresponding to the bit units of each of the entries of the decoding table.

3. The soft demodulation method of claim 2, wherein each of the bit units is comprised of 3 bits, 6 bits, or 9 bits.

4. The soft demodulation method of claim 2, wherein, if the partial sums corresponding to the bit units of a predetermined entry of the decoding table do not exceed a predetermined threshold value, a value of the predetermined entry is not calculated.

5. The soft demodulation method of claim 1, wherein the reference entries are "000", "001", "010", "100", and "101".

6. A soft demodulation apparatus, comprising:
   a partial sum calculator, which calculates partial sums for a unit of each predetermined number of bits of a codeword received from a channel;
   an entry calculator, which calculates a value of each entry of a decoding table by referring to the partial sums;
   a maximum detector, which detects a maximum among values of all calculated entries of the decoding table; and
   a log-likelihood ratio (LLR) calculator, which calculates an LLR using the detected maximum,
   wherein the partial sum calculator calculates the partial sums of each predetermined number of bits of the codeword by using reference entries, and each of the reference entries comprises a combination of some bits of each of the entries of the decoding table.

7. The soft demodulation apparatus of claim 6, wherein the entry calculator divides each of the entries of the decoding table into bit units each comprising the predetermined number of bits and sums up the partial sums corresponding to the bit units of each of the entries of the decoding table.

8. The soft demodulation apparatus of claim 6 further comprising:
   a threshold value determinator, which determines whether the partial sums corresponding to the bit units of each of the entries of the decoding table exceed a predetermined threshold value,
   wherein if the partial sums corresponding to bit units of a predetermined entry of the decoding table do not exceed a predetermined threshold value, the entry calculator does not calculate a value of the predetermined entry.

9. An optical signal processing apparatus of an optical disc device, comprising:
   a read/write unit to output a read code signal from an optical disc in the optical disc device;
   a reference entry unit which stores a predetermined number of reference entries;
   a partial sum calculator which calculates partial sums of n-bit portions of the read code signal received from the read/write unit corresponding to each stored reference entry;
   a partial sum table which stores the calculated partial sums corresponding to each n-bit portion of the read code signal;
   an entry calculator which calculates an entry value of each entry of a decoding table by summing the corresponding calculated partial sums stored in the partial sum table that correspond to an n-bit portion of the decoding table entry;
   a maximum detector which detects a maximum calculated entry value; and
   a log-likelihood ratio (LLR) calculator, which calculates an LLR using the detected maximum.

10. The apparatus of claim 9, wherein the partial sum table comprises sub tables corresponding to each n-bit portion of the read code signal.

11. The apparatus of claim 9, wherein the partial sum table comprises sub tables corresponding to each 2n-bit portion of the read code signal.

12. The apparatus of claim 9, wherein the partial sum table comprises sub tables corresponding to each 3n-bit portion of the read code signal.

13. The apparatus of claim 9, further comprising a threshold determiner to control the entry calculator to calculate the decoding table entry based on the calculated partial sums stored in the partial sum table exceeding a predetermined threshold, wherein when the calculated partial sums are below the predetermined threshold the entry calculator does not calculate the decoding table entry.

14. A soft demodulation method, comprising:
   storing predetermined reference entries;
   calculating partial sums corresponding to n-bit portions of a read code signal based on the stored predetermined reference entries;
   storing the calculated partial sums;
   calculating an entry value of each entry of a decoding table by adding the stored calculated partial sums which correspond to consecutive n-bit portions of the entry of the decoding table;
   detecting a maximum entry value; and
   calculating a log-likelihood ratio based on the detected maximum entry value.

15. The method of claim 14, wherein the storing the calculated partial sums comprises storing sub tables of the calculated partial sums corresponding to each n-bit portion of the read code signal.

16. The method of claim 14, further comprising determining if the calculated partial sums exceed a predetermined threshold, wherein when the calculated partial sums exceed the predetermined threshold the entry value of the decoding table is calculated and when the calculated partial sums are below the predetermined threshold the entry value of the decoding table is not calculated.

17. A soft demodulation method, comprising:
   calculating partial sums corresponding to a codeword;
   calculating a predetermined entry value of a decoding table, by adding the partial sums, wherein the partial sums are abandoned when the partial sums are less likely to be detected as a maximum and the partial sums are added together to calculate the predetermined entry value when the partial sums are more likely to be detected as a maximum; and
   detecting a maximum among the calculated predetermined entry values of the decoding table and calculating a log-likelihood ratio (LLR) using the detected maximum.

18. A soft demodulation method, comprising:
   calculating an entry value of a decoding table by calculating partial sums of predetermined portions of a codeword, wherein the entry value is skipped when the partial sums are below a predetermined threshold; and
   detecting a maximum of the calculated entry values of the decoding table and calculating a log-likelihood ratio (LLR) using the detected maximum.

* * * * *